United States Patent
Oki et al.

(10) Patent No.: US 11,888,147 B2
(45) Date of Patent: Jan. 30, 2024

(54) NONAQUEOUS ELECTROLYTE SECONDARY BATTERIES

(71) Applicants: Panasonic Corporation, Kadoma (JP); SANYO Electric Co., Ltd., Daito (JP)

(72) Inventors: Yukihiro Oki, Osaka (JP); Shun Nomura, Osaka (JP); Atsushi Ogata, Osaka (JP)

(73) Assignees: PANASONIC HOLDINGS CORPORATION, Kadoma (JP); PANASONIC ENERGY CO., LTD., Osaka (JP)

( * ) Notice: Subject to any disclaimer, the term of this patent is extended or adjusted under 35 U.S.C. 154(b) by 468 days.

(21) Appl. No.: 16/969,310

(22) PCT Filed: Feb. 1, 2019

(86) PCT No.: PCT/JP2019/003622
§ 371 (c)(1),
(2) Date: Aug. 12, 2020

(87) PCT Pub. No.: WO2019/163483
PCT Pub. Date: Aug. 29, 2019

(65) Prior Publication Data
US 2021/0050588 A1    Feb. 18, 2021

(30) Foreign Application Priority Data
Feb. 22, 2018  (JP) .................. 2018-029829

(51) Int. Cl.
*H01M 4/134* (2010.01)
*H01M 4/131* (2010.01)
(Continued)

(52) U.S. Cl.
CPC ........... *H01M 4/134* (2013.01); *H01M 4/131* (2013.01); *H01M 4/505* (2013.01); *H01M 4/525* (2013.01);
(Continued)

(58) Field of Classification Search
CPC .... H01M 4/134; H01M 4/1391; H01M 4/505; H01M 4/525; H01M 10/0525; H01M 2004/027; H01M 2004/028
See application file for complete search history.

(56) References Cited

U.S. PATENT DOCUMENTS 6,617,073 B1 * 9/2003 Matsumoto ........... H01M 4/525
429/231.95
2008/0118837 A1 * 5/2008 Shirane ............. H01M 10/0525
429/223
(Continued)

FOREIGN PATENT DOCUMENTS

EP    3373367 A1    9/2018
JP    H07-114942 A    5/1995
(Continued)

OTHER PUBLICATIONS

International search report dated May 7, 2019, issued in counterpart Application No. PCT/JP2019/003622. (2 pages).
(Continued)

*Primary Examiner* — Christopher P Domone
*Assistant Examiner* — Jonathan William Estes
(74) *Attorney, Agent, or Firm* — WHDA, LLP

(57) ABSTRACT

A nonaqueous electrolyte secondary battery (10) in an example embodiment includes a positive electrode (11) having a lithium metal composite oxide, and a negative electrode (12) having graphite. The lithium metal composite oxide includes first composite oxide particles which are secondary particles formed by aggregation of primary par-
(Continued)

ticles having an average particle size of 50 nm to 5 µm, and second composite oxide particles which are non-aggregated particles having an average particle size of 2 µm to 20 µm. The positive electrode (11) has lower initial charge/discharge efficiency than the initial charge/discharge efficiency of the negative electrode (12).

3 Claims, 3 Drawing Sheets

(51) Int. Cl.
*H01M 4/505* (2010.01)
*H01M 4/525* (2010.01)
*H01M 10/0525* (2010.01)
*H01M 4/02* (2006.01)

(52) U.S. Cl.
CPC .. *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2010/0081055 A1 | 4/2010 | Konishi et al. | |
| 2011/0291044 A1* | 12/2011 | Wang | H01M 4/505 252/182.1 |
| 2013/0084498 A1 | 4/2013 | Kimura et al. | |
| 2013/0302688 A1 | 11/2013 | Takezawa | |
| 2017/0149049 A1 | 5/2017 | Endoh et al. | |
| 2018/0287202 A1 | 10/2018 | Matsushita et al. | |

FOREIGN PATENT DOCUMENTS

| | | | | |
|---|---|---|---|---|
| JP | 2006-054159 A | | 2/2006 | |
| JP | 2006-294469 A | | 10/2006 | |
| JP | 2008251527 A | * | 10/2008 | ........ H01M 10/0525 |
| JP | 2010-86693 A | | 4/2010 | |
| JP | 2012-169300 A | | 9/2012 | |
| JP | 2013-082581 A | | 5/2013 | |
| JP | 2013-084549 A | | 5/2013 | |
| JP | 2013-222503 A | | 10/2013 | |
| JP | 2016-177984 A | | 10/2016 | |
| JP | 2017-107727 A | | 6/2017 | |
| WO | 2012/101970 A1 | | 8/2012 | |
| WO | 2015/198521 A1 | | 12/2015 | |
| WO | WO-2017098714 A1 | * | 6/2017 | ........ H01M 10/0525 |

OTHER PUBLICATIONS

Extended (Supplementary) European Search Report dated Apr. 23, 2021 issue in counterpart Application No. 19757588.9. (6 pages).

* cited by examiner

NONAQUEOUS ELECTROLYTE SECONDARY BATTERIES

TECHNICAL FIELD

The present disclosure relates to nonaqueous electrolyte secondary batteries.

BACKGROUND ART

The recent proliferation of nonaqueous electrolyte secondary batteries to in-vehicle applications and power storage applications has led to demands for high energy density and long life of nonaqueous electrolyte secondary batteries. For example, Patent Literature 1 discloses a nonaqueous electrolyte secondary battery which is improved in cycle characteristics (has a longer life) by using, as positive electrode active materials, a monocrystalline $LiNiO_2$ powder having an average particle size of not more than 10 μm, and a polycrystalline $LiNiO_2$ powder having a maximum particle size of not more than 30 μm and a crystallite size of not less than 30% of the particle size.

CITATION LIST

Patent Literature

PTL 1: Japanese Published Unexamined Patent Application No. 7-114942

SUMMARY OF INVENTION

Technical Problem

In nonaqueous electrolyte secondary batteries, the concurrent satisfaction of high energy density and long life is an important challenge that is not easy. If, for example, electrodes are increased in density to achieve a high energy density, an electrolytic solution hardly finds its way to the inside of the electrodes. Thus, the electrolytic solution that is used has to be low in viscosity. However, low-viscosity electrolytic solutions are generally decomposed easily to cause deteriorations in cycle characteristics. If, on the other hand, an extended life is approached by, for example, the surface modification of active materials, load characteristics are lowered and difficulties are encountered in increasing the density of electrodes, resulting in a decrease in energy density.

Solution to Problem

An aspect of the present disclosure resides in a nonaqueous electrolyte secondary battery including a positive electrode having a lithium metal composite oxide, and a negative electrode having graphite, wherein the lithium metal composite oxide includes first composite oxide particles which are secondary particles formed by aggregation of primary particles having an average particle size of 50 nm to 5 μm, and second composite oxide particles which are non-aggregated particles having an average particle size of 2 μm to 20 μm, and the positive electrode has lower initial charge/discharge efficiency than the initial charge/discharge efficiency of the negative electrode.

Advantageous Effects of Invention

The nonaqueous electrolyte secondary battery according to an aspect of the present disclosure has a high energy density and a long life.

DESCRIPTION OF EMBODIMENTS

As already mentioned, the concurrent satisfaction of high energy density and long life is an important challenge in nonaqueous electrolyte secondary batteries. The present inventors have successfully developed a nonaqueous electrolyte secondary battery with high energy density and long life by using in combination the first and the second composite oxide particles of lithium metal composite oxide described above as the positive electrode active material, and designing the electrodes so that the initial charge/discharge efficiency of the positive electrode<the initial charge/discharge efficiency of the negative electrode. The first composite oxide particles have higher initial charge/discharge efficiency than graphite that is the negative electrode active material, while the second composite oxide particles have lower initial charge/discharge efficiency than graphite. The initial charge/discharge efficiency of the positive electrode may be easily controlled by combining these two types of particles. A reason as to why the initial charge/discharge efficiency of the second composite oxide particles is low is probably because the particles have a small surface area and a long distance from the particle surface to the center of the particles, and thus lithium cannot fully return to the center of the particles during discharging.

As will be described in detail later, the positive electrode in the nonaqueous electrolyte secondary battery according to the present disclosure serves as a capacity-limiting electrode to make it possible to reduce the decrease in battery capacity stemming from the deterioration of the negative electrode after charge/discharge cycles. Further, cycle characteristics may be enhanced and the life of the battery may be extended while maintaining the energy density at a high level, by controlling the mixing ratio of the first and the second composite oxide particles.

Hereinbelow, an example embodiment of the present disclosure will be described in detail. In the following example embodiment, the nonaqueous electrolyte secondary battery according to the present disclosure will be illustrated as a cylindrical battery in which a wound electrode assembly 14 is accommodated in a cylindrical battery case 15. However, the battery may be other type of batteries such as a prismatic battery having a prismatic battery case, or a laminate battery having a battery case composed of a laminate sheet in which a metal layer and a resin layer are stacked together. In the present specification, for convenience of explanation, the side of the battery case 15 in which there is a sealing unit 17 is defined as "upside", and the side in which there is the bottom of an exterior case 16 is defined as "downside".

Figure 1:
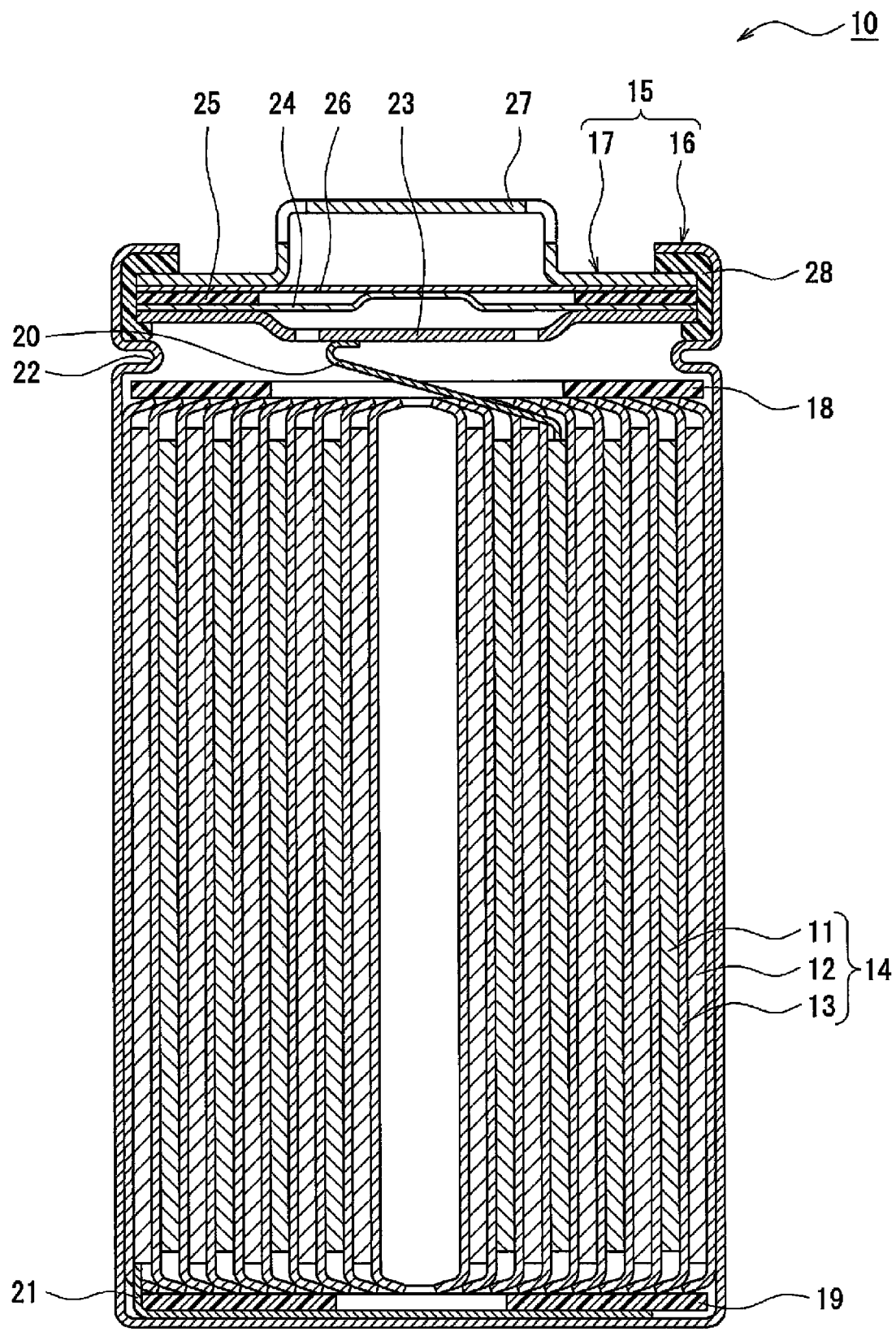
FIG. 1 is a sectional view of a nonaqueous electrolyte secondary battery according to an example embodiment.

FIG. 1 is a sectional view of a nonaqueous electrolyte secondary battery 10 according to an example embodiment. As illustrated in FIG. 1, the nonaqueous electrolyte secondary battery 10 includes an electrode assembly 14, a nonaqueous electrolyte (not shown), and a battery case 15 accommodating the electrode assembly 14 and the nonaqueous electrolyte. The electrode assembly 14 has a wound structure in which a positive electrode 11 and a negative electrode 12 are wound together via a separator 13. The battery case 15 is composed of a bottomed cylindrical exterior case 16, and a sealing unit 17 that closes the opening of the exterior case 16. Further, the nonaqueous electrolyte secondary battery 10 includes a resin gasket 28 disposed between the exterior case 16 and the sealing unit 17.

The electrode assembly 14 is composed of a long positive electrode 11, a long negative electrode 12, two long sheets of separators 13, a positive electrode lead 20 joined to the positive electrode 11, and a negative electrode lead 21 joined to the negative electrode 12. To prevent the precipitation of lithium, the negative electrode 12 is one size larger than the positive electrode 11. Specifically, the negative electrode 12 is formed larger than the positive electrode 11 in the longer direction and the shorter direction (the vertical direction). The two sheets of separators 13 are one size larger than at least the positive electrode 11, and are arranged, for example, so as to interpose the positive electrode 11 therebetween.

Insulating plates 18 and 19 are disposed on and under the electrode assembly 14, respectively. In the example illustrated in FIG. 1, the positive electrode lead 20 attached to the positive electrode 11 extends to the sealing unit 17 through a through-hole in the insulating plate 18, and the negative electrode lead 21 attached to the negative electrode 12 extends to the bottom of the exterior case 16 along the outside of the insulating plate 19. The positive electrode lead 20 is connected to the lower surface of a filter 23, which is the bottom plate of the sealing unit 17, by welding or the like. A cap 27, which is the top plate of the sealing unit 17, is electrically connected to the filter 23 and serves as a positive electrode terminal. The negative electrode lead 21 is connected to the inner surface of the bottom of the exterior case 16 by welding or the like, and the exterior case 16 serves as a negative electrode terminal.

For example, the exterior case 16 is a bottomed cylindrical metal container. The gasket 28 is disposed between the exterior case 16 and the sealing unit 17 to seal tightly the space inside the battery case 15. The exterior case 16 has a groove portion 22 which is formed by, for example, pressing a lateral surface portion from the outside and which supports the sealing unit 17 thereon. The groove portion 22 is preferably disposed in an annular shape along the circumferential direction of the exterior case 16, and supports the sealing unit 17 on the upper surface thereof. An upper end portion of the exterior case 16 is bent inward along the peripheral edge of the sealing unit 17 to fix the sealing unit 17.

The sealing unit 17 has a structure in which a filter 23, a lower valve 24, an insulating member 25, an upper valve 26 and a cap 27 are stacked in this order from the electrode assembly 14 side. The members constituting the sealing unit 17 each have, for example, a disk shape or a ring shape, and the members except the insulating member 25 are electrically connected to one another. The lower valve 24 and the upper valve 26 are connected to each other at their central portions, and the insulating member 25 is interposed between peripheral portions of the valves. In the event where the inner pressure of the battery is increased, the lower valve 24 is deformed so as to push the upper valve 26 toward the cap 27 and ruptures to interrupt the current path between the lower valve 24 and the upper valve 26. If the inner pressure is further elevated, the upper valve 26 is ruptured and allows the gas to be discharged through the opening in the cap 27.

[Positive Electrodes]

The positive electrode 11 includes a positive electrode current collector and a positive electrode mixture layer disposed on the current collector. The positive electrode current collector may be, for example, a foil of a metal that is stable at the potentials of the positive electrode 11, such as aluminum, or a film having such a metal as a skin layer. For example, the positive electrode current collector is a metal foil made of aluminum or aluminum alloy with a thickness of 10 to 20 µm. The positive electrode mixture layer includes a positive electrode active material, a conductive agent and a binder, and is preferably disposed on both sides of the positive electrode current collector. For example, the thickness of the positive electrode mixture layers is 30 to100 µm per side of the positive electrode current collector. The positive electrode 11 may be fabricated by applying a positive electrode mixture slurry including components such as a positive electrode active material, a conductive agent and a binder onto a positive electrode current collector, drying the wet films, and pressing the coatings to form positive electrode mixture layers on both sides of the positive electrode current collector.

The positive electrode 11 includes a lithium metal composite oxide as a positive electrode active material. The lithium metal composite oxide is a composite oxide containing Li and a metal element such as Co, Mn, Ni or Al. The metal element constituting the lithium metal composite oxide is at least one selected from, for example, Mg, Al, Ca, Sc, Ti, V, Cr, Mn, Fe, Co, Ni, Cu, Zn, Ga, Ge, Y, Zr, Sn, Sb, W, Pb and Bi. In particular, it is preferable that the composite oxide contain at least one selected from Co, Ni, Mn and Al.

Examples of the conductive agents include carbon materials such as carbon black, acetylene black, Ketjen black, graphite, carbon nanotubes, carbon nanofibers and graphene. The content of the conductive agent is, for example, 0.5 to 15 parts by mass, and preferably 1 to 10 parts by mass with respect to 100 parts by mass of the positive electrode active material. Examples of the binders include fluorine-containing resins such as polytetrafluoroethylene (PTFE) and polyvinylidene fluoride (PVdF), polyacrylonitriles (PAN), polyimides, acrylic resins and polyolefins. Further, these resins may be used in combination with, for example, carboxymethyl cellulose (CMC) or a salt thereof, and polyethylene oxide (PEO). The content of the binder is, for example, 0.1 to 10 parts by mass, and preferably 0.5 to 5 parts by mass with respect to 100 parts by mass of the positive electrode active material.

The lithium metal composite oxide includes first composite oxide particles and second composite oxide particles. The first composite oxide particles are secondary particles formed by the aggregation of primary particles having an average particle size of 50 nm to 5 µm, and more preferably 100 nm to 3 µm. The first composite oxide particles have grain boundaries formed by the primary particles. The second composite oxide particles are non-aggregated particles having an average particle size of 2 μm to 20 μm, and have no grain boundaries formed by the primary particles. The primary particles constituting the first composite oxide particles may be identified with a scanning electron microscope (SEM). The average particle size of the primary particles may be determined by randomly selecting one hundred primary particles in a SEM image of the first composite oxide particles, measuring the diameters of the circumscribed circles of the particles, and averaging the measured values.

The first composite oxide particles are secondary particles formed by the aggregation of the primary particles. The primary particles constituting the first composite oxide particles adhere to one another with such a strength that the particles are not separated even when a strong force is applied thereto such as during the pulverization after the synthesis of the first composite oxide particles, or during the preparation of a positive electrode mixture slurry. For example, the second composite oxide particles are preferably monocrystalline primary particles. The crystallinity of the first and the second composite oxide particles may be identified with a scanning ion microscope.

The average particle size of the first composite oxide particles (the secondary particles) is preferably 3 μm to 30 μm, and more preferably 4 μm to 25 μm. The average particle size of the second composite oxide particles is preferably 2 to 20 μm, and more preferably 3 to 18 μm. The average particle sizes of the first and the second composite oxide particles are each the particle size at 50% cumulative volume (also called the median size or the 50% volume average particle size) in the grain size distribution measured with a laser diffraction scattering grain size distribution analyzer (for example, LA-750 manufactured by HORIBA, Ltd.).

The initial charge/discharge efficiency of the positive electrode 11 decreases with increasing ratio of the second composite oxide particles to the first composite oxide particles (see FIG. 4 described later). Specifically, when all the particles used are the second composite oxide particles, the initial charge/discharge efficiency is, for example, 80 to 85% and is lower than the initial charge/discharge efficiency when only the first composite oxide particles are used (for example, 93 to 97%). This is probably because, as already described hereinabove, the second composite oxide particles have a small surface area and a long distance from the particle surface to the center of the particles, and thus lithium cannot fully return to the center of the particles during discharging.

The second composite oxide particles may be synthesized by the method described in EXAMPLES later. For example, the second composite oxide particles may be synthesized by increasing the pH of an alkaline aqueous solution used in the synthesis of a precursor (a metal composite hydroxide) containing Ni, Co, Mn, Al, etc., and/or increasing the temperature at which the precursor is calcined, as compared to when the first composite oxide particles are synthesized.

For example, the first composite oxide particles include a lithium metal composite oxide having a hexagonal crystal structure belonging to the space group R-3m, and preferably include $LiNi_xCo_yMn_zO_2$ ($0.3<x<0.6$, $x+y+z=1$) or $LiNi_xCo_yAl_zO_2$ ($0.8<x<0.95$, $x+y+z=1$) as a main component. Here, the term "main component" means that the component represents the largest mass proportion among the components constituting the first composite oxide particles (the same applies to the second composite oxide particles).

Similarly to the first composite oxide particles, the second composite oxide particles preferably include a lithium metal composite oxide having a hexagonal crystal structure belonging to the space group R-3m. The composition of the second composite oxide particles may be the same as or different from the composition of the first composite oxide particles. It is particularly preferable that the second composite oxide particles include $LiNi_xCo_yMn_zO_2$ ($0.3<x<0.6$, $x+y+z=1$) as a main component.

The content of the second composite oxide particles is 10 to 75 mass %, preferably 15 to 60 mass %, and more preferably 20 to 55 mass % of the total mass of the first composite oxide particles and the second composite oxide particles. When the content of the second composite oxide particles is in this range, a high energy density and good cycle characteristics are concurrently attained easily. The positive electrode active material in the positive electrode 11 may include the first and the second composite oxide particles alone, and may include other components as long as the object of the present disclosure is not impaired.

In the nonaqueous electrolyte secondary battery 10, the positive electrode active material is a mixture of the first composite oxide particles and the second composite oxide particles in the predetermined ratio. By the use of this mixture, the initial charge/discharge efficiency of the positive electrode 11 becomes lower than the initial charge/discharge efficiency of the negative electrode 12. In other words, the first composite oxide particles and the second composite oxide particles are mixed in a mixing ratio which is controlled so that the initial charge/discharge efficiency of the positive electrode 11 will be lower than the initial charge/discharge efficiency of the negative electrode 12. While details will be described later, the negative electrode 12 includes graphite as a negative electrode active material.

Figure 2:
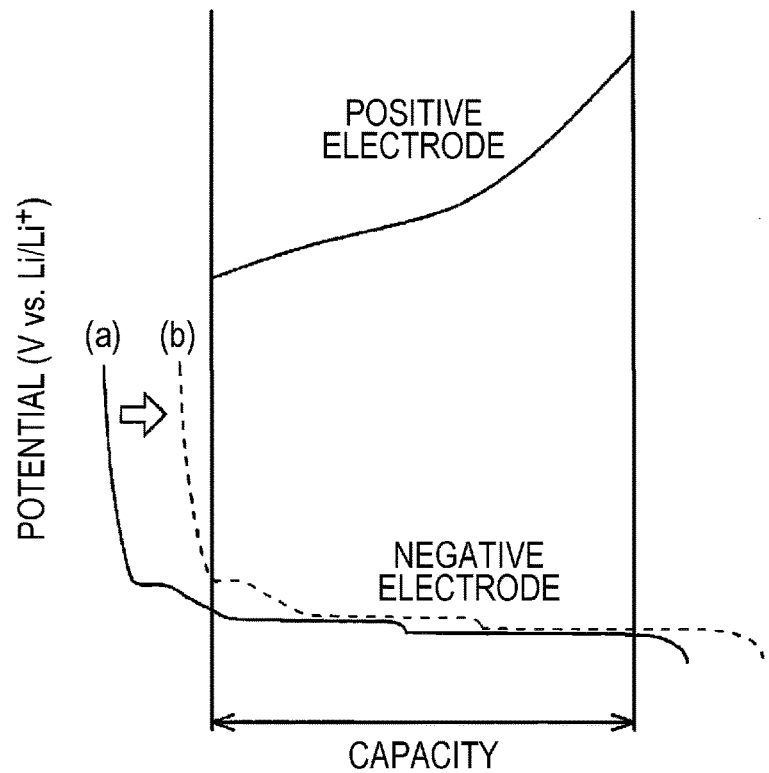
FIG. 2 is a diagram illustrating relationships of the positive electrode potential and the negative electrode potential with the state of charge of a nonaqueous electrolyte secondary battery according to an example embodiment.
Figure 5:
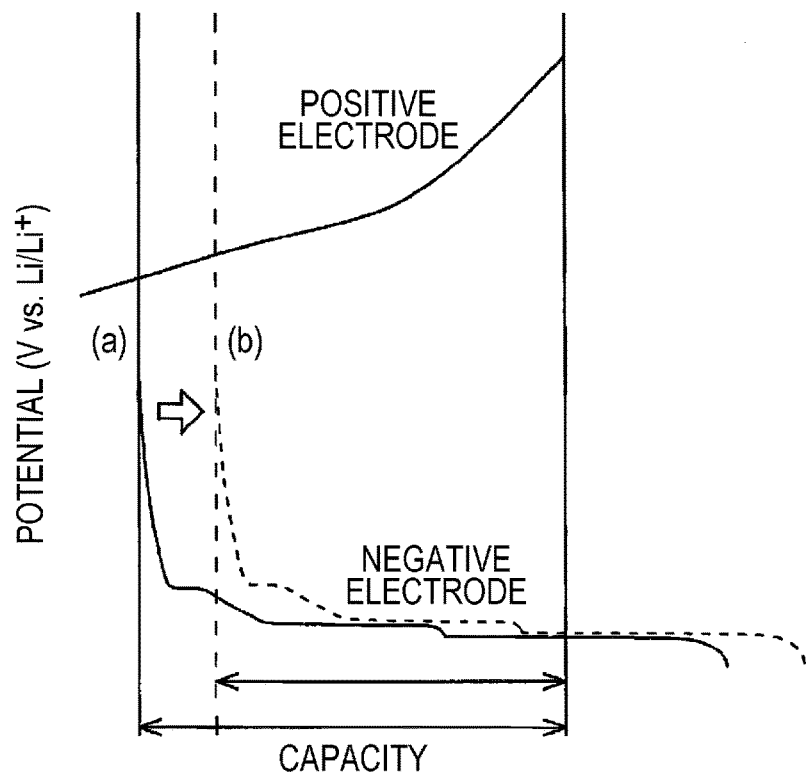
FIG. 5 is a diagram illustrating relationships of the positive electrode potential and the negative electrode potential with the state of charge of a conventional nonaqueous electrolyte secondary battery.

Here, the influence of the initial charge/discharge efficiencies of the positive electrode 11 and the negative electrode 12 on cycle characteristics will be described in detail with reference to FIGS. 2 and 5. FIG. 2 is a diagram illustrating relationships of the positive electrode potential and the negative electrode potential with the state of charge of the nonaqueous electrolyte secondary battery 10. For comparison, reference will be made appropriately to FIG. 5 that illustrates relationships of the positive electrode potential and the negative electrode potential with the state of charge (SOC) of a conventional nonaqueous electrolyte secondary battery. In FIG. 2 and FIG. 5, (a) shows the state of the battery in the initial cycle, and (b) is the state of the battery after predetermined cycles.

In the conventional general nonaqueous electrolyte secondary battery, as illustrated in FIG. 5, the initial charge/discharge efficiency of the negative electrode is lower than the initial charge/discharge efficiency of the positive electrode, and the discharge capacity is limited by the negative electrode. In the nonaqueous electrolyte secondary battery 10, as illustrated in FIG. 2, the initial charge/discharge efficiency of the positive electrode 11 is lower than the initial charge/discharge efficiency of the negative electrode 12, and the discharge capacity is limited by the positive electrode 11. When the electrode which limits the discharge capacity is the negative electrode, for example, the positive electrode potential and the negative electrode potential in the discharged state (SOC=0%) are about 3.65 V and about 0.5 V, respectively, and the battery voltage that is the difference between these potentials is about 3.15 V. In the case of the nonaqueous electrolyte secondary battery 10 in which the capacity-limiting electrode is the positive electrode 11, for example, the positive electrode potential and the negative electrode potential in the discharged state (SOC=0%) are about 3.55 V and not more than 0.25 V, respectively, and the battery voltage is 3.3 V or more.

In nonaqueous electrolyte secondary batteries using a lithium metal composite oxide, in particular, a hexagonal lithium metal composite oxide belonging to the space group R-3m in the positive electrode, and graphite in the negative electrode, it is generally the case that more side reactions occur on the negative electrode than on the positive electrode during charge/discharge cycles. Due to this difference in the amount of side reactions between the positive electrode and the negative electrode, as illustrated in FIG. 5, the position of the negative electrode relative to the positive electrode shifts to the right with the progress of charge/discharge cycles. Since the electrode which limits the discharge capacity in the conventional general nonaqueous electrolyte secondary batteries is the negative electrode, the rightward shift of the position of the negative electrode relative to the positive electrode leads to the corresponding decrease in battery capacity.

In the nonaqueous electrolyte secondary battery 10, in contrast, the electrode limiting the discharge capacity is the positive electrode 11. Thus, as illustrated in FIG. 2, the decrease in battery capacity is apparently zero unless the discharge end of the negative electrode 12 is moved to the position of the discharge end of the positive electrode 11. Consequently, the nonaqueous electrolyte secondary battery 10 attains excellent cycle characteristics. If the sharp rise in potential near the discharge end of the negative electrode is used for charging and discharging, it is expected that, for example, excessive film destruction and regeneration will occur on the negative electrode surface, and the negative electrode will expand to cause a deformation of the electrode assembly. In the nonaqueous electrolyte secondary battery 10, however, this rising part is not used for charging and discharging, and further enhancements in cycle characteristics can be expected.

The initial charge/discharge efficiencies of the positive electrode and the negative electrode may be determined by fabricating batteries using the positive electrode or the negative electrode and lithium metal as the counter electrode, charging and discharging the batteries at a predetermined current (for example, 0.03 mA/cm$^2$), and calculating the ratios of the discharge capacity to the charge capacity. While the initial charge/discharge efficiency is obtained by measuring the charge and discharge capacities in the first cycle, even a nonaqueous electrolyte secondary battery that has been subjected to more than one cycle of charging and discharging may be deemed as satisfying the initial charge/discharge efficiency of the positive electrode<the initial charge/discharge efficiency of the negative electrode, as long as the negative electrode potential is 0.25 V (vs. Li/Li$^+$) or less.

Figure 3:
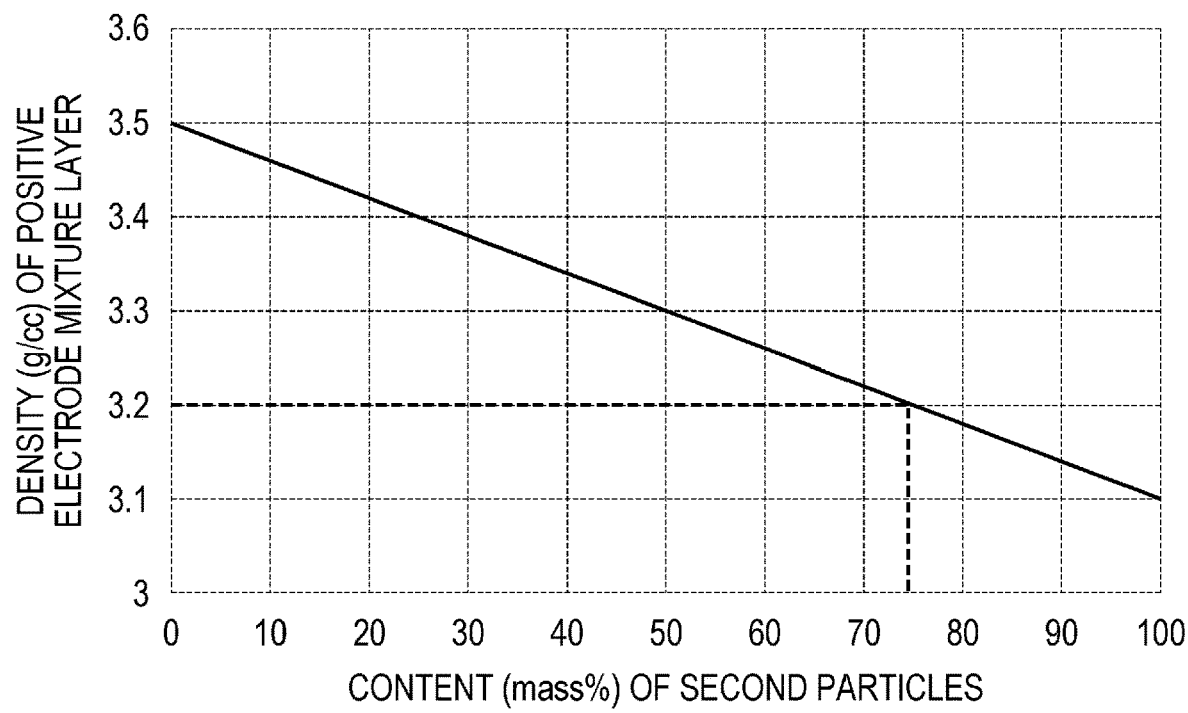
FIG. 3 is a diagram illustrating a relationship between the content of second composite oxide particles and the density of a positive electrode mixture layer.

FIG. 3 is a diagram illustrating a relationship between the content of the second composite oxide particles relative to the total mass of the first composite oxide particles and the second composite oxide particles, and the density of a positive electrode mixture layer. The second composite oxide particles are harder and have lower filling properties than the first composite oxide particles. Thus, as illustrated in FIG. 3, the density of a positive electrode mixture layer tends to decrease with increasing amount of the second composite oxide particles, that is, with decreasing amount of the first composite oxide particles. In order to design batteries to attain a high energy density that meets the market demands, it is desirable to ensure that the density of a positive electrode mixture layer is 3.2 g/cc or more. From this point of view, the content of the second composite oxide particles is preferably not more than 75 mass % of the total mass of the first composite oxide particles and the second composite oxide particles.

Figure 4:
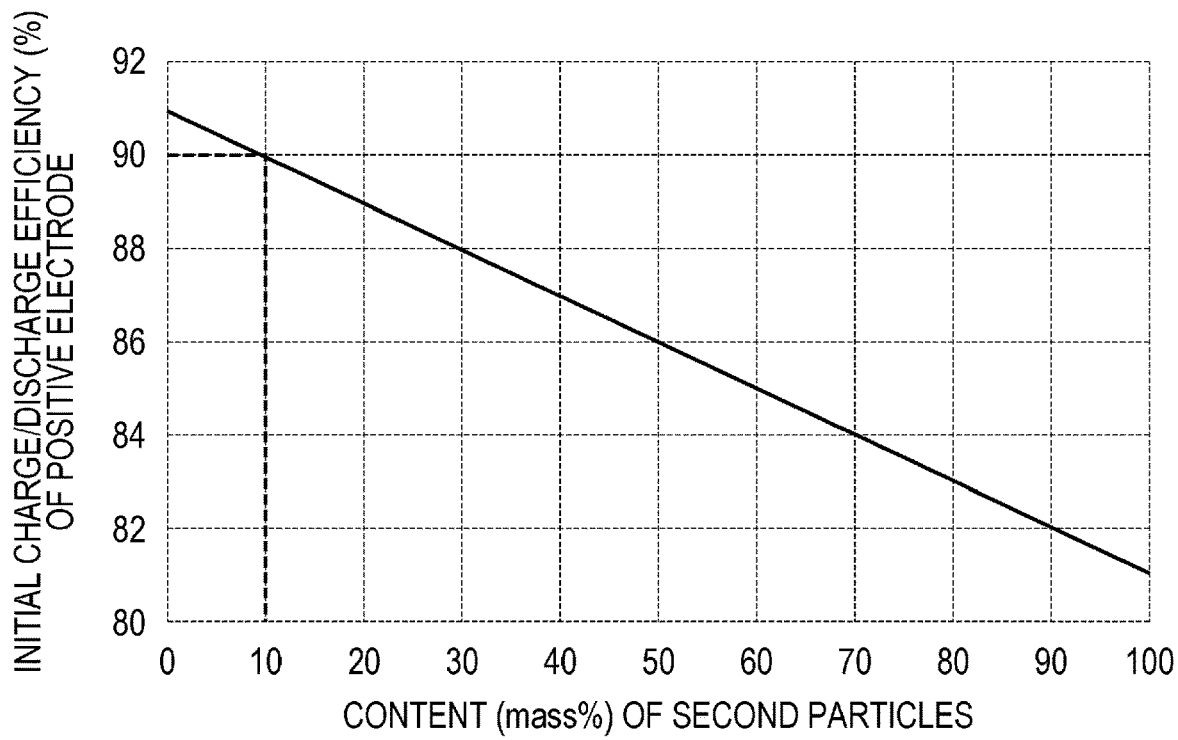
FIG. 4 is a diagram illustrating a relationship between the content of second composite oxide particles and the initial charge/discharge efficiency of a positive electrode.

FIG. 4 is a diagram illustrating a relationship between the content of the second composite oxide particles relative to the total mass of the first composite oxide particles and the second composite oxide particles, and the initial charge/discharge efficiency of the positive electrode. As illustrated in FIG. 4, the initial charge/discharge efficiency of the positive electrode tends to decrease with increasing amount of the second composite oxide particles, that is, with decreasing amount of the first composite oxide particles. Since the initial charge/discharge efficiency of a negative electrode using graphite is generally about 90%, the content of the second composite oxide particles is preferably 10 mass % or more of the mass of the lithium metal composite oxide.

[Negative Electrodes]

The negative electrode 12 includes a negative electrode current collector and a negative electrode mixture layer disposed on the current collector. The negative electrode current collector may be, for example, a foil of a metal that is stable at the potentials of the negative electrode 12, such as copper, or a film having such a metal as a skin layer. For example, the negative electrode current collector is a metal foil made of copper or copper alloy with a thickness of 5 to 15 μm. The negative electrode mixture layer includes a negative electrode active material and a binder, and is preferably disposed on both sides of the negative electrode current collector. For example, the thickness of the negative electrode mixture layers is 30 to 100 μm per side of the negative electrode current collector. The negative electrode 12 may be fabricated by applying a negative electrode mixture slurry including components such as a negative electrode active material and a binder onto a negative electrode current collector, drying the wet films, and pressing the coatings to form negative electrode mixture layers on both sides of the negative electrode current collector.

The negative electrode 12 includes graphite as the negative electrode active material. The graphite may be natural graphite or artificial graphite, and may include a plurality of types of graphites in combination. The negative electrode 12 including graphite generally has an initial charge/discharge efficiency of 88 to 94%. In other words, the graphite used as the negative electrode active material is preferably selected so that the initial charge/discharge efficiency of the negative electrode 12 will be 88 to 94%. The initial charge/discharge efficiency of the negative electrode 12 may be measured by the same method as the initial charge/discharge efficiency of the positive electrode 11. The negative electrode 12 may have a negative electrode active material other than graphite, such as a metal compound containing Si, Sn or the like, as long as the object of the present disclosure is not impaired.

Examples of the binders used in the negative electrode mixture layers include fluorine-containing resins such as PTFE and PVdF, PAN, polyimides, acrylic resins, polyolefins and styrene-butadiene rubbers (SBR). Further, the negative electrode mixture layers may include, for example, CMC or a salt thereof, polyacrylic acid (PAA) or a salt thereof, and polyvinyl alcohol (PVA). The content of the binder is, for example, 0.1 to 10 parts by mass, and preferably 0.5 to 5 parts by mass with respect to 100 parts by mass of the negative electrode active material.

[Separators]

The separator 13 is a porous sheet having ion permeability and insulating properties. Specific examples of the porous sheets include microporous thin films, woven fabrics and nonwoven fabrics. Some suitable separator materials are polyolefins such as polyethylene and polypropylene, and celluloses. The separator 13 may have a monolayer structure or a multilayer structure. Further, a resin layer having high heat resistance such as aramid resin may be disposed on the surface of the separator 13.

A filler layer including an inorganic filler may be disposed at the interface between the separator 13 and at least one of the positive electrode 11 and the negative electrode 12. Examples of the inorganic fillers include oxides containing such metals as Ti, Al, Si and Mg, and phosphoric acid compounds. The filler layer may be formed by applying a slurry containing the filler onto the surface of the positive electrode 11, the negative electrode 12 or the separator 13.

[Nonaqueous Electrolytes]

The nonaqueous electrolyte includes a nonaqueous solvent and an electrolyte salt dissolved in the nonaqueous solvent. Examples of the nonaqueous solvents which may be used include esters, ethers, nitriles such as acetonitrile, amides such as dimethylformamide, and mixtures of two or more kinds of these solvents. The nonaqueous solvent may include a halogenated solvent resulting from the substitution of the above solvent with a halogen atom such as fluorine in place of at least part of hydrogen. Examples of the halogenated solvents include fluorinated cyclic carbonate esters such as fluoroethylene carbonate (FEC), fluorinated chain carbonate esters, and fluorinated chain carboxylate esters such as fluoromethyl propionate (FMP). From the point of view of enhancing cycle characteristics, it is preferable to use a fluorinated solvent such as FEC or FMP. The content of the fluorinated solvent is preferably 30 to 50 vol % (25° C.) of the volume of the nonaqueous solvent.

Examples of the esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methyl propyl carbonate, ethyl propyl carbonate and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP) and ethyl propionate.

Some example cyclic ethers are 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers. Some example chain ethers are 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

The electrolyte salt is preferably a lithium salt. Examples of the lithium salts include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ ($1<x<6$, and n is 1 or 2), $LiB_{10}Cl_{10}$, LiCl, LiBr, LiI, chloroborane lithium, lower aliphatic carboxylic acid lithiums, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are integers of 0 or greater}. The lithium salts may be used singly, or a plurality thereof may be used as a mixture. Of the above lithium salts, $LiPF_6$ is preferably used from points of view such as ion conductivity and electrochemical stability. The concentration of the lithium salt is, for example, 0.8 mol to 1.8 mol per L of the nonaqueous solvent.

EXAMPLES

The present disclosure will be described in more detail based on EXAMPLES hereinbelow. However, it should be construed that the scope of the present disclosure is not limited to such EXAMPLES.

Example 1

[Synthesis of First Composite Oxide Particles]

Nickel sulfate, cobalt sulfate and manganese sulfate were mixed together in predetermined proportions and were uniformly mixed in an alkaline aqueous solution having a pH of 9 to 10 to give a precursor. Next, the precursor and lithium carbonate were mixed together, and the mixture was calcined at a temperature of 950° C. for 10 hours and then pulverized to give first composite oxide particles in the form of secondary particles formed by the aggregation of primary particles. The composition and average particle size of the particles were as follows.

Composition: $LiNi_{0.5}Co_{0.2}Mn_{0.3}O_2$

Average particle size of primary particles: 1.6 μm

Average particle size of secondary particles (first composite oxide particles): 14.1 μm

[Synthesis of Second Composite Oxide Particles]

Second composite oxide particles in the form of non-aggregated particles were obtained in the same manner as the first composite oxide particles, except that the pH of the alkaline aqueous solution was changed to 10 to 11, and the calcination temperature was changed to 1000° C. The composition and average particle size of the particles were as follows.

Composition: $LiNi_{0.5}Co_{0.2}Mn_{0.3}O_2$

Average particle size: 4.5 μm

[Fabrication of Positive Electrode]

A 1:1 by mass mixture of the first composite oxide particles and the second composite oxide particles was used as a positive electrode active material. A positive electrode mixture slurry was prepared by mixing 95 parts by mass of the positive electrode active material, 2 parts by mass of acetylene black (AB) and 3 parts by mass of PVdF, followed by addition of an appropriate amount of N-methyl-2-pyrrolidone (NMP). Next, the positive electrode mixture slurry was applied to both sides of a 15 μm thick aluminum foil as a positive electrode current collector by a doctor blade method. The wet films were dried. Subsequently, the coatings were compressed with a roll press machine so that the positive electrode thickness would be 150 μm. The sheet was then cut into a predetermined electrode size. Thus, a positive electrode was fabricated which had positive electrode mixture layers on both sides of the positive electrode current collector.

[Fabrication of Negative Electrode]

A graphite powder having an initial charge/discharge efficiency of 90% was used as a negative electrode active material. A negative electrode mixture slurry was prepared by mixing 96 parts by mass of the negative electrode active material, 2 parts by mass of sodium carboxymethylcellulose (CMC-Na) and 2 parts by mass of a dispersion of styrene-butadiene rubber (SBR), followed by addition of an appropriate amount of water. Next, the negative electrode mixture slurry was applied to both sides of a 10 μm thick copper foil as a negative electrode current collector by a doctor blade method. The wet films were dried. Subsequently, the coatings were compressed with a roll press machine so that the negative electrode thickness would be 150 μm. The sheet was then cut into a predetermined electrode size. Thus, a negative electrode was fabricated which had negative electrode mixture layers on both sides of the negative electrode current collector.

[Preparation of Nonaqueous Electrolyte]

Fluoroethylene carbonate (FEC), ethylene carbonate (EC), ethyl methyl carbonate (EMC) and dimethyl carbonate (DMC) were mixed together in a volume ratio of 1:1:4:4 (25° C.). $LiPF_6$ was dissolved into the mixed solvent with a concentration of 1.4 mol/L. A nonaqueous electrolyte was thus prepared.

[Fabrication of Battery]

An aluminum lead and a nickel lead were attached to the positive electrode and the negative electrode, respectively, and the positive electrode and the negative electrode were wound into a coil via a 16 μm thick polyethylene separator. A wound electrode assembly was thus fabricated. The electrode assembly was placed into a bottomed cylindrical exterior case, and the nonaqueous electrolyte was poured into the exterior case. Thereafter, the opening of the exterior case was sealed. An 18650 cylindrical secondary battery having an outer diameter of 18 mm, a height of 65 mm and a battery capacity of 2300 mAh was thus fabricated.

The battery was evaluated by the following methods. The evaluation results are described in Table 1.

[Density of Positive Electrode Mixture Layers]

The positive electrode was compressed at a linear pressure of 30000 N/m using a roll press machine, and the thickness and weight of the positive electrode were measured to calculate the density of the positive electrode mixture layers.

[Initial Charge/Discharge Efficiency of Positive Electrode]

A coin-type battery was fabricated using a 2 cm×2 cm square cut from the positive electrode, and lithium metal as the counter electrode. The battery was charged and discharged at a current value of 0.03 mA/cm², and the initial charge/discharge efficiency of the positive electrode was calculated from the ratio of the discharge capacity to the charge capacity.

[Battery Capacity]

The discharge capacity was measured and expressed relative to the discharge capacity of a battery of COMPARATIVE EXAMPLE 1 taken as 100. The discharge capacity was measured under the following charging and discharging conditions. First, the battery was charged at a constant current of 1150 mA to a battery voltage of 4.1 V, and was further charged at a constant voltage of 4.1 V until the current value reached 46 mA. After a rest of 10 minutes, the battery was discharged at a constant current of 1150 mA until the battery voltage fell to 3.0 V. The temperature during the charging and discharging was 25° C.

[Cycle Characteristics]

The battery was charged and discharged 300 times under the following conditions. The ratio of the discharge capacity in the 300th cycle to the discharge capacity in the 1st cycle (the capacity retention ratio) was calculated. The rest time after discharging was 20 minutes.

Temperature: 25° C.

Charging (CCCV): 1150 mA x 4.1 V, 46 mA cutoff, 10 minutes rest after charging

Discharging (CC): 460 mA x 3.0 V, 20 minutes rest after discharging

Comparative Example 1

A positive electrode and a nonaqueous electrolyte secondary battery were fabricated and evaluated in the same manner as in EXAMPLE 1, except that only the first composite oxide particles were used as the positive electrode active material.

Comparative Example 2

A positive electrode and a nonaqueous electrolyte secondary battery were fabricated and their performances were evaluated in the same manner as in EXAMPLE 1, except that only the second composite oxide particles were used as the positive electrode active material.

TABLE 1

| | Density of positive electrode mixture layers | Initial charge/discharge efficiency of positive electrode | Battery capacity | Capacity retention ratio |
| --- | --- | --- | --- | --- |
| EX. 1 | 3.3 g/cc | 86% | 96 | 97 |
| COMP. EX. 1 | 3.5 g/cc | 91% | 100 | 90 |
| COMP. EX. 2 | 3.1 g/cc | 81% | 90 | 98 |

As described in Table 1, the battery of EXAMPLE was high in battery capacity and capacity retention ratio, attaining a high energy density and a long life. In contrast, the battery of COMPARATIVE EXAMPLE 1 had a capacity retention ratio of 90% and was poor in cycle characteristics, although the energy density was high due to good filling properties of the positive electrode active material and the consequent high density of the mixture layers. Since the capacity-limiting electrode in the battery of COMPARATIVE EXAMPLE 1 was the negative electrode, this result was probably ascribed mainly to the decrease in capacity due to the degradation of the negative electrode. The battery of COMPARATIVE EXAMPLE 2 was 10% lower in capacity than the battery of COMPARATIVE EXAMPLE 1, probably because the initial charge/discharge efficiency of the positive electrode was lower than the initial charge/discharge efficiency of the negative electrode, and also because the amount in which the mixture slurry was applied was reduced to adjust the thickness of the positive electrode to 150 μm. The battery of EXAMPLE compared substantially equally to the battery of COMPARATIVE EXAMPLE 2 in terms of capacity retention ratio in the cycle test, in spite of the fact that the difference in initial charge/discharge efficiency between the positive electrode and the negative electrode was smaller than that of the battery of COMPARATIVE EXAMPLE 2.

As described above, it has been demonstrated that high battery capacity and good cycle characteristics can be obtained concurrently by using the first and the second composite oxide particles as the lithium metal composite oxides and by combining such composite oxide particles so that the initial charge/discharge efficiency of the positive electrode<the initial charge/discharge efficiency of the negative electrode. While EXAMPLE described above used $LiNi_{0.5}Co_{0.2}Mn_{0.3}O_2$ particles as the first composite oxide particles, similar effects can be expected also when using $LiNi_xCo_yMn_zO_2$ particles (0.8<x<0.95, x+y+z=1).

REFERENCE SIGNS LIST

10 NONAQUEOUS ELECTROLYTE SECONDARY BATTERY, 11 POSITIVE ELECTRODE, 12 NEGA-

TIVE ELECTRODE, 13 SEPARATOR, 14 ELECTRODE ASSEMBLY, 15 BATTERY CASE, 16 EXTERIOR CASE, 17 SEALING UNIT, 18, 19 INSULATING PLATES, 20 POSITIVE ELECTRODE LEAD, 21 NEGATIVE ELECTRODE LEAD, 22 GROOVE PORTION, 23 FILTER, 24 LOWER VALVE, 25 INSULATING MEMBER, UPPER VALVE, 27 CAP, 28 GASKET

The invention claimed is:

1. A nonaqueous electrolyte secondary battery comprising a positive electrode having a lithium metal composite oxide, and a negative electrode having graphite, wherein the lithium metal composite oxide comprises first composite oxide particles which are secondary particles formed by aggregation of primary particles, the primary particles having an average particle size of 50 nm to 5 μm, and second composite oxide particles which are non-aggregated monocrystalline particles having an average particle size of 2 μm to 20 μm, wherein a mass percentage content of the second composite oxide particles to the total mass of the first composite oxide particles and the second composite oxide particles in the positive electrode is configured such that the positive electrode has lower initial charge/discharge efficiency than the initial charge/discharge efficiency of the negative electrode, and wherein the content of the second composite oxide particles is 10 to 50 mass % of the total mass of the first composite oxide particles and the second composite oxide particles.

2. The nonaqueous electrolyte secondary battery according to claim 1, wherein the second composite oxide particles include $LiNi_xCo_yMn_zO_2$ ($0.3<x<0.6$, $x+y+z=1$) as a main component.

3. The nonaqueous electrolyte secondary battery according to claim 1, wherein the first composite oxide particles include $LiNi_xCo_yMn_zO_2$ ($0.3<x<0.6$, $x+y+z=1$) or $LiNi_xCo_yAl_zO_2$ ($0.8<x<0.95$, $x+y+z=1$) as a main component.

* * * * *